No. 771,054. PATENTED SEPT. 27, 1904.
I. FOX.
SPECTACLE FRAME.
APPLICATION FILED MAY 13, 1904.
NO MODEL.
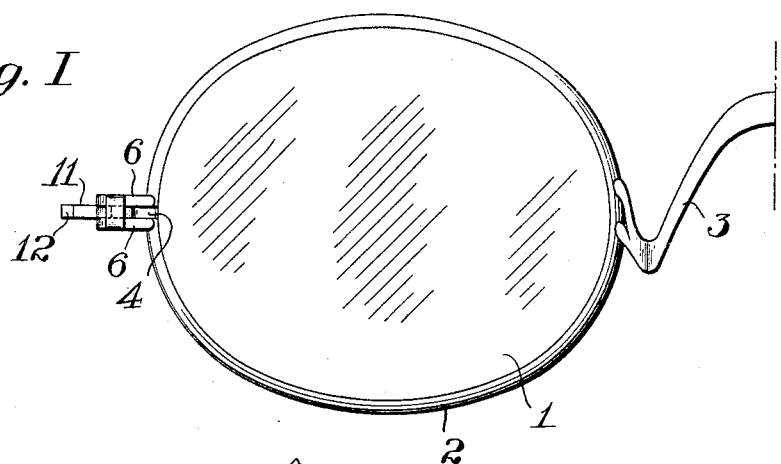
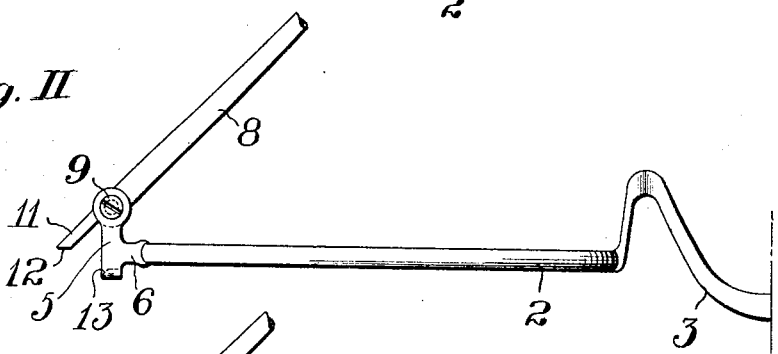
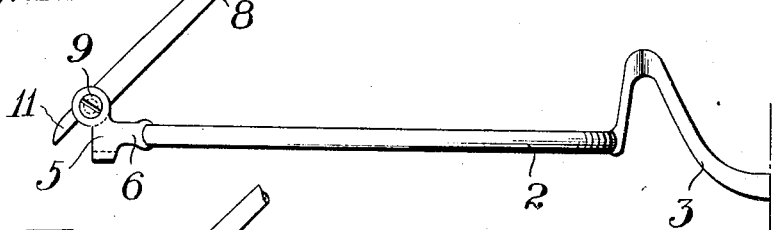
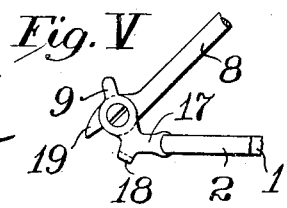

No. 771,054. Patented September 27, 1904.

UNITED STATES PATENT OFFICE.

IVAN FOX, OF PHILADELPHIA, PENNSYLVANIA.

SPECTACLE-FRAME.

SPECIFICATION forming part of Letters Patent No. 771,054, dated September 27, 1904.

Application filed May 13, 1904. Serial No. 207,750. (No model.)

*To all whom it may concern:*

Be it known that I, IVAN FOX, a citizen of the United States, residing in the city of Philadelphia, county of Philadelphia, and State of Pennsylvania, have invented certain new and useful Improvements in Spectacle-Frames, of which the following is a specification.

This invention relates to improvements in spectacle frames of that class in which the eye wires are discontinuous, the ends of the said eye wire being located adjacent to each other at the outer end of the major axis of the eye glass lens.

One of the objects of the invention is to provide an improved means of connection between the adjacent ends of the eye wire and the temple wire, which will permit and facilitate the adjustment of the ends of the eye wire toward and from each other, to vary the area inclosed by the eye wire, to adapt it to eye glass lenses of varying sizes. Other objects and advantages will become apparent in the course of the description.

The invention resides in the novel construction and arrangement of the parts as hereinafter described in the specification, specifically set forth in the claims, and as illustrated in the drawings accompanying and forming a part of this specification, and in which, Figure I is a front elevation of an eye glass lens, and its inclosing eye wire, showing my invention;

Figure II is an edge view of the same;

Figure III is an edge view showing a slightly modified construction;

Figure IV is an edge view showing still another modified construction; and

Figures V and VI are edge and front views, respectively, of portions of an eye glass and frame showing still another modified form of construction.

In the drawings, 1 designates a lens, 2 an eye wire surrounding the lens, and 3 a bridge connecting the eye wires of the respective lenses of a pair of spectacles, only one eye wire and lens being shown, however. The eye wire is discontinuous, being separated, and having adjacent ends, as clearly indicated at 4 in Figures I and VI of the drawings.

In Figures I, II and III of the drawings, 5 designates a U-shaped cheek piece, the respective legs of which are connected to the respective adjacent ends of the eye wire by means of the connecting pieces 6, which are illustrated as projections formed integral with the respective legs of the U-shaped cheek piece 5.

The said projections or connecting pieces 6 are secured to the respective ends of the eye wire, as indicated in Figure I, by soldering or in any other suitable manner. It is to be understood, however, that instead of forming the projecting pieces 6 integrally with the cheek piece 5, as shown, the said connecting pieces 6 may be formed by extending the respective ends of the eye wire 2 and bending them outwardly and connecting the same, by soldering or otherwise, to the respective legs of the U-shaped cheek piece 5.

8 designates the temple wires which are connected between the free ends of the legs of the cheek piece 5 by means of a screw 9 passing through the said free ends and the temple wire. It is to be understood, however, that the temple wires may be connected to the cheek piece by any other suitable means, for instance, a rivet.

It will be noted that the projections 6 are connected respectively to the legs of the U-shaped cheek piece, and that the said projections, together with the legs of the said U-shaped cheek piece, constitute strips which are secured together by the bent strip of material constituting the bight or loop of the U-shaped cheek piece, and that by reason of the said strips being connected by such bent strip, they may be adjusted toward and from each other, for the purpose of clamping the eye wire tightly around the lens and also for the purpose of clamping the legs of the U-shaped cheek piece against the opposite sides of the temple wire to take up any lost motion between the temple wire and the said legs.

In Figures I and II, the temple wire 8 is provided with a projection 11 which extends beyond the pivot screw 9, the forward free end of the said projection being beveled, as indicated at 12, and adapted to be seated upon the bevel formed at the bight or loop of the U-shaped cheek piece 5 and indicated by the dotted lines at 13 in Figure II of the drawings.

When the beveled end 12 of the projection 11 is seated against the bevel 13, the projection 11 is located between the legs of the U-shaped cheek piece 5, and the outer edge of the said projection is flush with the outer edges of the legs of the said cheek piece.

In Figure III, the projection 11 is adapted to abut or contact with the outer edge of the bight or loop of the U-shaped cheek piece 5, shown in said figure, and the said projection does not enter the space between the respective legs of the cheek piece when the eye wire is in open position.

In Figure IV, 14 designates a U-shaped loop, the respectively free ends thereof being connected to the respective adjacent ends of the eye wire 2. 15 designates projections extending rearwardly from the respective legs of the U-shaped loop 14, and to and between the outer ends of said projections, the forward end of the temple wire 8 is secured by means of the pivot screw or similar device 9.

16 designates a projection integral with the temple wire and extending beyond the pivot 9. The forward end of the said projection is bent outwardly somewhat and is also slightly beveled outwardly so as to adapt it to be seated against the edge of the bight or bent portion of the loop 14, so as to limit the outward movement of the temple wire 8. When the temple wire 8 is in open position, the main portion of the projection 16 rests in the space between the respective projections 15, extending rearwardly from the legs of the loops 14, whereby rocking movement of the temple wire longitudinally of its pivot is prevented.

In Figure IV, the projections 15, together with the respective legs of the U-shaped loop 14, to which they are connected, constitutes separate strips, which are connected by the bent strip which constitutes the bight or bend of the U-shaped loop 14, and by means of the said bent strip the said strips may be adjusted toward and from each other in the same manner and for the same purposes as stated with respect to the construction shown in Figures I-III, inclusive.

In the modified construction shown in Figures V and VI, the respective adjacent ends of the eye wire 2 are connected to angular strips 17, the said strips being connected together at their angles by means of a bent strip 18 integral with the said strips. The portions of the said angular strips beyond the bent strip which connects them extend rearwardly and at an obtuse angle to the plane of the lenses of a pair of eye glasses.

The temple wire 8 is pivoted between the rearwardly extending portions of the angular strips 17, and at a point a considerable distance in front of the rear ends of the said rearwardly extending portions. The forwardly extending projection 19 of the temple wire shown in said Figures V and VI forms a stop which abuts against or contacts with the strip 18 to limit the outward movement of the temple wire. When the temple wire is in its outermost position, that is to say, when it is in the position which it occupies when worn, a short portion thereof in rear of the pivot screw 9 is located between the portions of the angular strips 17 in rear of the said pivot screw. By this means lengthwise rocking of the temple wire upon its pivot is prevented and the lenses are maintained in proper relation to the eyes of the wearer.

By pivoting the temple wire in front of the rear ends of the rearwardly projecting portions or strips 17, so that the portions of the said strips beyond the pivot are located upon opposite sides of the temple wire to prevent the temple wires from rocking lengthwise of its pivot, the projection 19 may be made quite short, it being only necessary that such projection be of sufficient length to abut against the strip 18 to limit the outward movement of the temple wire 8. It will thus be seen that a considerable saving of metal is effected, which is of great importance, especially when the frames are constructed of gold.

In Figure VI, it will be observed that the end portions of the strips 17, which are connected to the adjacent ends of the eye wire, have been adjusted toward each other so as to bring the said adjacent ends of the eye wire almost into contact, the result being a somewhat neater appearance than is the case when the ends are more widely separated, as indicated in Figure I.

It will be understood that the strips 17 may be adjusted toward and from each other throughout their entire length, as is the case in the forms of constructions shown in Figures I-IV, inclusive of the drawings.

It will also be noted that in each of the constructions illustrated, the end portions of the strips which are connected to the adjacent ends of the eye wire may be adjusted toward and from each other without a corresponding adjustment of the outer end portions of the said strips, and also that the outer end portions of the said strips may be adjusted toward and from each other without a corresponding adjustment of the end portions of the strips which are connected to the adjacent ends of the eye wire.

Having thus described my invention, I claim—

1. In an eye glass frame, the combination of a discontinuous eye wire, a temple, separate strips connected at their inner ends to the respective adjacent ends of the said eye wire, and at points removed from their inner ends to the said temple, and a strip connecting the said strips.

2. In an eye glass frame, the combination of a discontinuous eye wire, a temple, strips respectively connected at their inner ends to the adjacent ends of the said eye wire, and at points removed from their inner ends to the said temple, and a strip connecting the said strips whereby the latter, or portions thereof, as desired, may be adjusted toward and from each other.

3. In an eye glass frame, the combination of a discontinuous eye wire having adjacent ends, a U-shaped cheek piece, adjustable connections between the respective legs of the U-shaped cheek piece and the respective ends of the eye wire, and a temple pivotally secured between the legs of the U-shaped cheek piece.

4. In an eye glass frame, the combination of a discontinuous eye wire having separated adjacent ends, a U-shaped cheek piece extending at an angle to the plane of the said eye wire, connecting pieces, each of which is connected at one end to one of the legs of the said U-shaped cheek piece, and at its other end to one of the ends of the said eye wire, and a temple pivotally secured between the legs of the said U-shaped cheek piece.

5. In an eye glass, the combination of an eye glass lens, a discontinuous eye wire surrounding the said lens, the said wire having separated adjacent ends, a U-shaped loop extending at an angle to the plane of the eye wire and its inclosed lens, the free ends of the loop extending rearwardly, connecting pieces, each of which is connected at one end to one of the legs of the said loop, and at its other end to one of the ends of the eye wire, and a temple connected to the legs of the said loop.

6. In an eye glass frame, the combination of a discontinuous eye wire having adjacent free ends, angular strips connected to the said ends, the outer portions of the said strips extending rearwardly, and the temple wire pivoted between the said strips at a point in front of the rear ends of the rearwardly extending portions, the portions of the said strips in rear of the pivot being located upon opposite sides of the temple wire when it is in open position, and being of sufficient length to prevent rocking movement of the temple wire longitudinally of its pivot.

In testimony that I claim the foregoing as my invention I have hereunto signed my name this 10th day of May, A. D. 1904.

IVAN FOX.

In presence of—
   CYRUS N. ANDERSON,
   THOS. K. LANCASTER.